United States Patent [19]  [11]  4,100,857
Gutridge et al.  [45]  Jul. 18, 1978

[54] PASSAGEWAY BETWEEN ADJACENT RAILWAY PASSENGER CAR COMPARTMENTS

[75] Inventors: Jack E. Gutridge, Dyer; Walter J. Marulic, Gary, both of Ind.

[73] Assignee: Pullman Incorporated, Chicago, Ill.

[21] Appl. No.: 786,752

[22] Filed: Apr. 11, 1977

[51] Int. Cl.² ............................................ B61D 35/00
[52] U.S. Cl. ...................................... 105/323; 52/67; 105/315
[58] Field of Search .................... 105/314, 315, 323; 52/67; 296/23 R

[56] References Cited

U.S. PATENT DOCUMENTS

| 1,767,361 | 6/1930 | Hautot | 105/315 |
| 2,000,549 | 5/1935 | Woodward | 105/315 |
| 2,760,443 | 8/1956 | Gobrecht | 105/315 |
| 3,832,810 | 9/1974 | Johnston | 52/67 |

FOREIGN PATENT DOCUMENTS

| 1,931,381 | 12/1970 | Fed. Rep. of Germany | 296/23 R |
| 2,423,561 | 5/1974 | Fed. Rep. of Germany | 296/23 R |
| 1,212,711 | 11/1970 | United Kingdom | 52/67 |

Primary Examiner—Drayton E. Hoffman
Assistant Examiner—Carl Rowold
Attorney, Agent, or Firm—Thomas G. Anderson

[57] ABSTRACT

A railway passenger car includes a bedroom compartment having a commode enclosure comprising a pair of enclosure sections which during non-use are moved together into a confined and compact manner providing greater compartment space and during use can be moved apart to provide an enlarged commode area.

5 Claims, 3 Drawing Figures

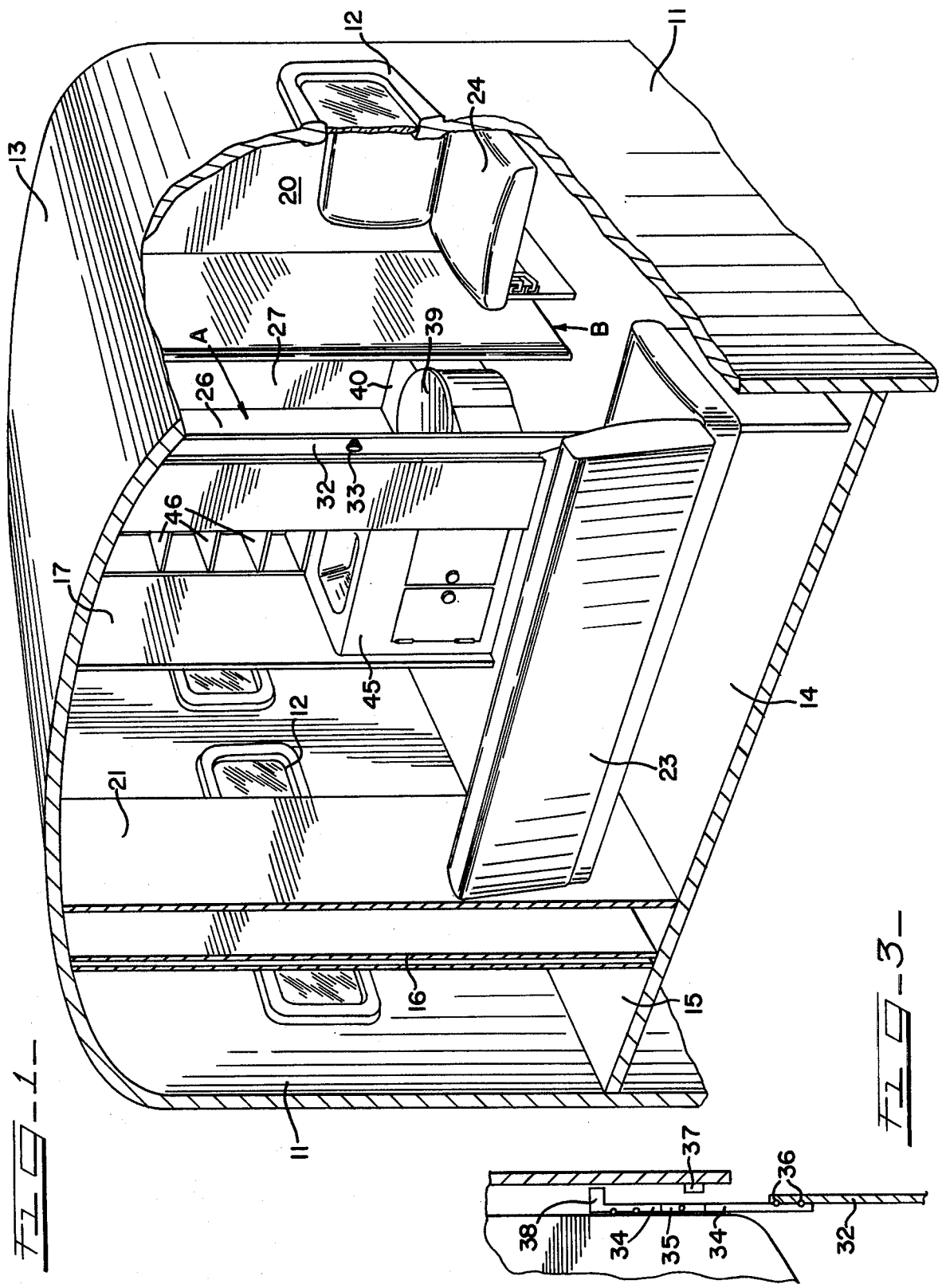

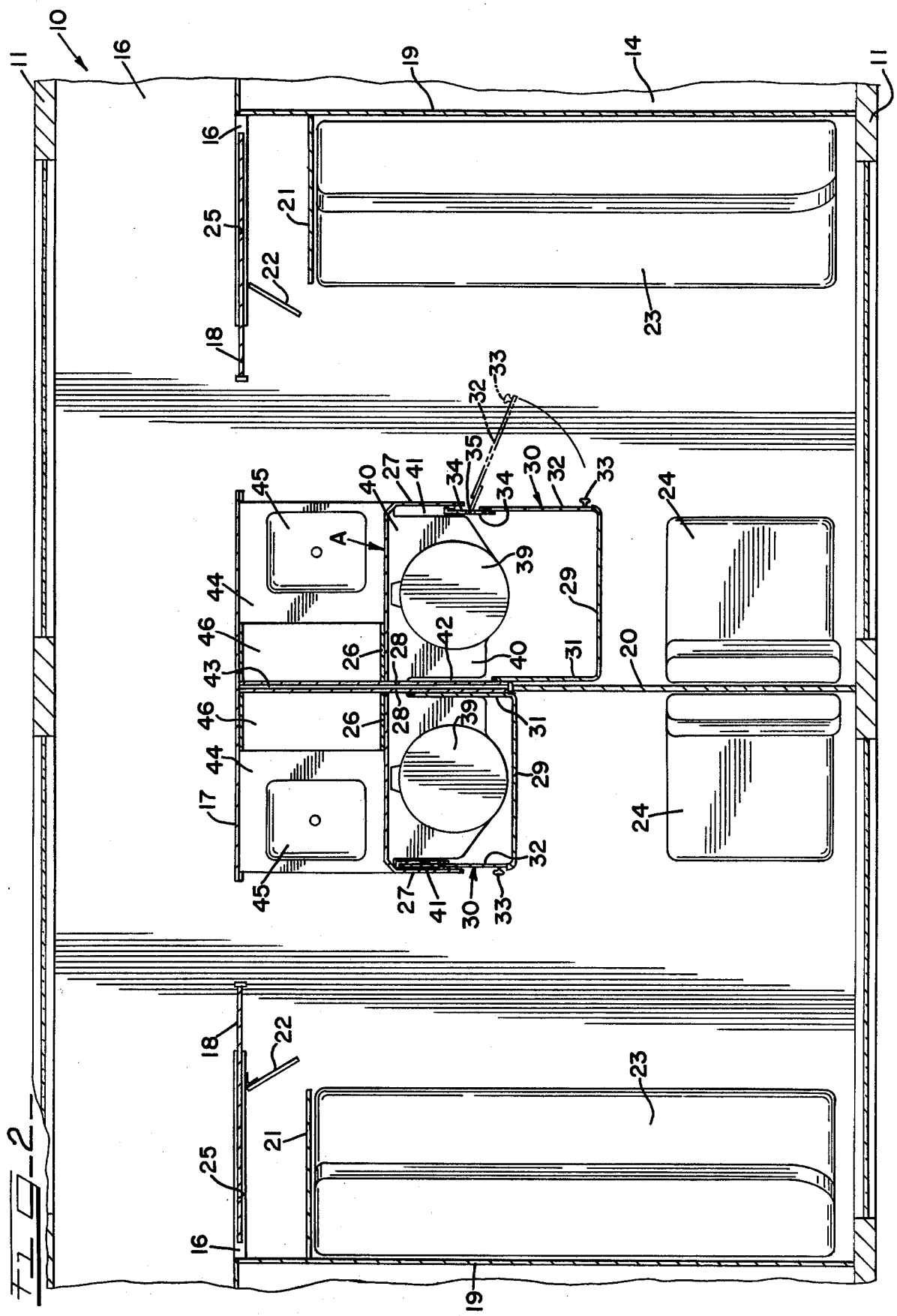

PASSAGEWAY BETWEEN ADJACENT RAILWAY PASSENGER CAR COMPARTMENTS

BACKGROUND OF THE INVENTION

1. Field of the Invention

The present invention relates to railway passenger cars and particularly to sleeping compartments which include complete lavatory and toilet facilities.

2. Description of the Prior Art

The prior art particularly pertinent are U.S. Pat. Nos. 2,145,435; Jan. 31, 1939, 2,914,002; Nov. 24, 1959 and 2,307,560; Jan. 5, 1943. The present invention is an improvement over the prior art Patents.

SUMMARY OF THE INVENTION

The present invention is particularly adaptable to a railway passenger compartment which includes full toilet and lavatory facilities. The present construction includes within the passenger compartment a commode enclosure comprising of a pair of generally U-shaped sections one of which is permanently supported on the floor of the car and a U-shaped section slidable relative to the first section to either enlarge the compartment for passenger use or to collapse the same into a confined and compact area thus expanding the size of the bedroom compartment as a whole. The U-shaped enclosure of the commode area includes vertical wall portions which are slidingly relatively movable to provide for the compaction and expansion of the area. One of the wall portions includes a hinged door which during the expanded position of the compartment section is usually movable to provide for access to the compartment. The invention is particularly adaptable to arrangement wherein a sliding door separates each of the compartments the said sliding door being movable to increase the size of the area into an enlarged compartment for occupancy by a plurality of passengers. In such an arrangement two of the expandable commode enclosures are positioned in adjacent relation each of which is movable or each of which is capable of being expanded or compacted as desired during use and non-use conditions within the compartment.

BRIEF DESCRIPTION OF THE DRAWINGS

FIG. 1 is a cross-sectional view through a railway car showing a bedroom compartment;

FIG. 2 is a cross-sectional plan view of a pair of adjacent compartments of the type shown in FIG. 1;

FIG. 3 is a detailed cross-sectional enlarged view showing a hinged door on one of the commode enclosure sections.

DESCRIPTION OF THE PREFERRED EMBODIMENT

Referring now particularly to FIG. 1 and 2 a railway passenger car 10 comprises side walls 11 and side windows 12. The car 10 includes a roof structure 13 and floor 14 which is arranged to provide at one side thereof an elongated aisle 15 of conventional structure. The passenger car 10 is divided into a plurality of substantially identical compartments which are separated from the aisle 15 by means of longitudinally extending partition walls 16 and 17. The partition walls 16 are relatively hollow as indicated at 25 and have contained therein vertical sliding panel doors 18 which may be slid between open and close positions relative to the partition wall 17 thus providing access to the interior of the compartments. Adjacent compartments within the car are formed by transversely extending divider walls 19 on one end of each compartment the adjacent compartment also being separated by a sliding divider wall 20 as best indicated in FIG. 2.

A longitudinally extending short vertical wall 21 is positioned adjacent to and parallel with the partition walls 16 to provide a suitable clothes or luggage compartment which may be closed by means of a hinged door 22. Each compartment also includes a convertible couch and seat structure 23 with a window seat 24 adjacent the side walls of the car, the seats of adjacent compartments being positioned in back-to-back relation separated only by the sliding divider 20 as best shown in FIG. 2.

Each of the compartments includes a commode enclosure formed by U-shaped wall sections or structures designated by the letters A and B. The sections A each comprise a first enclosure wall 26 extending longitudinally substantially parallel to the wall 17. Connected to the vertical longitudinal wall portions 26 are transversely extending and vertically disposed wall portions 27 and 28 each providing a U-shaped section. As best shown in FIG. 2. the wall portions 28 extend and continue outwardly for connection to the longitudinal partition walls 17. The section B comprises a second enclosure wall 29 substantially parallel to the wall 26 and has connected thereto vertically extending and transversely disposed second vertical wall portions 30 and 31. The configuration of section B also thus is U-shaped to conform to section A. The second wall portions 30 of each section B disclosed also include a door 32 having a suitable door handle and lock 33. The door 32 also has connected thereto a pair of vertically extending door panel extensions 34 particularly shown in FIG. 3. The panel extensions 34 are interconnected at their upper and lower surfaces by means of hinge members so that the sections 34 may hinge relatively to each other as best shown in FIG. 2. One end of the extension 34 is also slidingly connected to one end of the door 32 by means of roller connections 36 which may be of conventional construction and which connect the parts together and permit relative sliding or rolling movement. Such designs are well known in the art and need notfurther be described. A suitable stop 37 is provided on each first vertical wall portion 27 and is adapted to be engaged by another stop 38 provided on one of the panel extensions 34 when the commode enclosure is expanded to its use position as will be described. Each of the commode enclosures includes a commode generally designated at 39 the same also including a commode structure 40 which as best shown in FIG. 2 on one side of the enclosure is adapted to provide with the wall 27 an enlarged space or recess 41. The other side of the commode structure 40 is also adapted as shown in FIG. 2 to provide with the walls recesses 42 with said recess 41 providing for the collapsing or compacting movement of the section B into the A section. The spaced walls 28 also provide a recess 43 which is adpated to receive the sliding door 20 when the plurality of compartments are to be used as a single compartment for several passengers. As indicated previously the sliding arrangement of the doors is facilitated by suitable rollers and guides which permit the doors to slide and the sections to be collapsed together such devices being well known and in the prior art. Each of the compartments also is provided with a sink or vanity area 44 immediately adjacent to each of the commode enclosures and each includes a sink or vanity 45 with suitable shelving 46 above the sink as particularly indicated in FIG. 1.

THE OPERATION

In the position of the sliding door 20 as shown in FIG. 2 the compartments are isolated from each other into two sleeping accommodations. Each of the compartments fully self-sufficient in lavatory and closet arrangements. If desired the two compartments can readily be converted into a large compartment area by merely sliding the closet door 20 into the recess 43 whereby the area may serve several passengers. In FIG. 2 the left hand commode enclosure is shown in a collapsed condition whereupon greater area is provided in the compartment. In this particular situation the U-shaped sections have been moved together and the door 30 is partially recessed within the recesses 41 and 42. In the other compartment the enclosure has been moved outwardly to the expanded condition with the sections A and B pulled apart so that now the door 32 may be easily open about the hinge arrangement 35 provided in the panel extension 34. After use the commode can again be moved to the collapsed position again expanding the area of the particular compartment.

What is claimed is:

1. In a railway passenger car having a pair of compartments disposed in side by side relation and including an outer wall and a wall structure defining the inner side of the compartments and having door openings providing access from each compartment to an aisle in said car, the improvement comprising:
   a telescoping divider wall separating said compartments and extending between said outer wall and said wall structure and having a portion slidable toward and away from said outer wall to respectively close off the compartments from each other and to provide a passageway between said compartments,
   a sanitary closet including an enclosure in each compartment disposed at opposite sides of said divider wall intermediate the ends thereof,
   each enclosure comprising a fixed section and a U-shaped extension section,
   said fixed section having a first wall extending transversely from the divider wall into the respective compartment and having a second wall extending from the edge of the first wall remote from the divider wall in laterally spaced relation and generally parallel therewith,
   said U-shaped extension section including inner and outer wall members and an interconnecting end wall member, and
   each said extension section being separately telescopable into the respective fixed section from said passageway between said compartments and said interconnecting end wall members being transversely alignable with respect to each other and with respect to the end of the divider wall when it is in its retracted position to provide a wide aisle therebetween attendant to said slidable portion of the divider wall being telescoped to provide said passageway.

2. The invention in accordance with claim 1, each said enclosure including an opening and door therefore in each second wall providing communication between said enclosure and said compartment.

3. The invention in accordance with claim 2, said door including an edge portion comprising a pair of adjacent vertical panels hingedly connected together, and means on said door and panels interconnecting the same for relative sliding movement; whereby attendant to telescoping a respective extension section into the respective fixed section, said door is partially recessed within said fixed section.

4. The invention in accordance with claim 3, including stop means on one of said panels and said fixed section for limiting telescoping movement of said fixed and U-shaped sections.

5. The invention according to claim 2, and said second wall comprising a slot for admitting the outer wall and door of the associated enclosure section.

* * * * *